United States Patent [19]

Borman et al.

[11] 3,904,561

[45] Sept. 9, 1975

[54] PREPARATION OF POLYESTER RESINS WITH ENHANCED MOLDING PROPERTIES

[75] Inventors: Willem F. H. Borman; Eugene P. Reilly, both of Pittsfield, Mass.

[73] Assignee: General Electric Company, Pittsfield, Mass.

[22] Filed: Nov. 29, 1972

[21] Appl. No.: 310,537

[52] U.S. Cl............................. 260/22 R; 264/300
[51] Int. Cl........................ C08g 17/40; C08g 39/02
[58] Field of Search......... 260/22 R, 22 M; 264/300

[56] References Cited
UNITED STATES PATENTS

| | | | |
|---|---|---|---|
| 2,008,417 | 7/1935 | Groff................................ | 260/22 R |
| 2,154,639 | 4/1939 | Röhm et al........................ | 264/300 |
| 2,905,650 | 9/1959 | Agens .............................. | 260/22 R |
| 3,002,942 | 10/1961 | Zoetbrood ........................ | 260/22 R |
| 3,330,789 | 7/1967 | Aylesworth et al............... | 260/22 R |
| 3,390,108 | 6/1968 | Keck et al........................ | 260/22 M |
| 3,390,135 | 6/1968 | Seiner .............................. | 260/22 M |
| 3,423,341 | 1/1969 | Klare et al....................... | 260/22 M |
| 3,516,957 | 6/1970 | Gray et al. ...................... | 260/22 R |
| 3,666,697 | 5/1972 | Peloza.............................. | 264/300 |

OTHER PUBLICATIONS

Bjorksten et al., Polyesters and their Applications, Reinhold Publishing Corporation, New York, N.Y., 1956, pages 98, 99, 114 & 448.

*Primary Examiner*—Ronald W. Griffin
*Attorney, Agent, or Firm*—William F. Mufatti; Edward A. Hedman; Rocco S. Barrese

[57] ABSTRACT

A process is provided for the production of high molecular weight, linear poly(alkylene terephthalates) having little tendency for sticking in a mold and with much superior surface appearance after molding, the process comprising self-condensing a bis ester of a glycol and terephthalic acid with removal of glycol in the presence of a small, effective amount of a fatty acid, e.g., stearic acid.

10 Claims, No Drawings

PREPARATION OF POLYESTER RESINS WITH ENHANCED MOLDING PROPERTIES

This invention relates to the preparation of polymeric alkylene glycol esters of terephthalic acid. More particularly, there is provided an improved process to make such polyesters, having a very high molecular weight, yet with little tendency to stick to the surface of a mold when cooled from the melt therein and having a highly glossy surface appearance after molding.

BACKGROUND OF THE INVENTION

Poly(alkylene terephthalates) have substantial utility in the film and fiber business and, more recently, because of their outstanding chemical, physical, electrical properties and smooth, glossy surface, they have found use as thermoplastic resinous components in three dimensional molded articles. The general family of such polyesters are described in Whinfield, U.S. Pat. No. 3,465,319 and Pengilly, U.S. Pat. No. 3,047,539, both incorporated herein by reference, and elsewhere.

Among the polyester may be mentioned poly(ethylene terephthalate), poly(1,3-propylene terephthalate), poly(1,4-butylene terephthalate), and the like. These resins frequently tend to stick to the surface of the mold when cooled from the melt, as during injection molding. To prevent this it has been necessary to add a lubricating agent to the finished resin, but this is somewhat difficult because of slippage in the extruder during compounding, the problem of obtaining adequate mixing, and variations in properties between batches.

The manufacturing process would be simplified if an additive to prevent sticking and enhance surface appearance could be added at some stage during the polymerization process. However, when conventional additives, such as fatty alcohols, fatty esters or fatty amides are added to the polymerization reactor, the additive reacts with the resin prepolymer, and this often affects the melt viscosity adversely, and can also cause discoloration of the final product. Moreover, as will be seen hereinafter, the surface appearance in molded parts may also be worsened and, most importantly, such interreaction renders the conventional additives ineffective as release agents, and the resin sticks to the mold.

It has now been discovered that small effective amounts of a fatty acid can be included in the reacting mass during polymerization and the polymerization can be finished in an entirely conventional manner. There is no discoloration or deterioration of the polymer when a fatty acid is used. Moreover, the polyester product does not exhibit mold sticking during injection molding. Traces of fatty acid, which may remain in the reactor, have not been found to adversely affect the properties of subsequent batches.

The present discovery is unexpected because closely related compounds, such as fatty alcohols, fatty glycerides, fatty esters and fatty amides, when substituted for the fatty acid, all produce discolored resins ranging from off-white to tan and even darker; give gloss ratings which are no better than equal to those of the controls and often less; and reduce mold sticking but do not eliminate it substantially entirely, as do the fatty acids. These data will be set forth in the Examples.

Description of the Invention

According to the present invention, there is provided a process for the preparation of a high molecular weight, linear poly(alkylene terephthalate) resin having no substantial tendency to stick to the surface of a mold when cooled from the melt therein and having a highly glossy surface appearance after molding, said process comprising subjecting a bis ester of a glycol and a terphthalic acid to selfcondensation with the removal of the glycol in the presence of a small, effective amount of a fatty acid of the general formula $$C_nH_{2n+1}COOH$$

wherein $n$ is a whole number of from about 8 to about 30.

A preferred feature of the invention will include the step of preparing the bis ester by reacting said glycol and a di(lower)alkyl ester of terephthalic acid at a molar ratio of at least about 2:1 under alcoholysis conditions until the (lower)alkyl alcohol substantially ceases to be evolved by the reaction mixture.

Still another preferred feature of the invention will be a process wherein the self-condensation is carried out in three stages by i. heating the bis ester under reduced pressure at a temperature of from about 250° to about 300°C. until a first portion of the glycol has been evolved;

ii. adding the fatty acid to the partially condensed polyester of intermediate molecular weight produced in stage (i); and iii. continuing the heating under reduced pressure of the mixture produced in stage (ii) with the removal of glycol until a high molecular weight product is obtained.

The high molecular weight, linear poly(alkylene terephthalate) resins preoduced by the process of this invention can be derived from glycols, such as ethylene glycol, 1,2-propanediol, 1,4-butanediol, 1,4-dimethylolcyclohexane, 2,2-bis[4-($\beta$-hydroxyethyl)phenyl]propane, and the like. They may include small amounts, e.g., of up to about 15 mol.% of groups derived from other polyols, such as glycerol, and other diacids such as isophthalic acid, succinic acid, naphthalene dicarboxylic acid and the like.

The molecular weight of the final product will be sufficiently high to provide an intrinsic viscosity of from about 0.6 to about 2.0 deciliters per gram and preferably from about 0.8 to about 1.4 dl./g., measured, for example, on a solution in a 60:40 mixture of phenol and tetrachloroethane at 30°C.

The melt viscosity of the final product will be less than or equal to but no greater than that of controls prepared by polycondensation without the fatty acid additive. The gloss will always be better than that of the corresponding control after molding.

With respect to the fatty acid, this will be a member selected from among the family having the general formula:

$$C_nH_{2n+1}COOH$$

wherein $n$ is a whole number from about 8 to 30. It is seen that fatty acids of the saturated type are contemplated. Illustrative such acids are caprylic, capric, lauric, palmitic, stearic, and the like. Especially preferred is stearic acid.

The amount of fatty acid used in the reaction mixture can vary fairly widely, but in general, it will be within the range of 0.20 to 2.5 percent based on the weight of the bis ester used, and preferably will be from 0.2 to 1.5 percent, on the same basis.

In the practice of the invention, the preparation of the glycol ester and its subsequent polymerization is, in general, carried out in accordance with the usual, known techniques. Thus, the reaction is preferably carried out in the absence of oxygen, generally in an atmosphere of an inert gas such as nitrogen or the like, in order to lessen darkening and to make it possible to obtain a high molecular weight pale or colorless product. Bubbling an inert gas through the reacting mixture serves the added functions of agitation and of expediting the removal of volatile components formed by the reaction. The polymerization or condensation reaction is carried out under reduced pressure, generally below 25 millimeters of mercury pressure and usually at or below 1 millimeter of mercury pressur at a temperature in the range of from 150° to 300°C.

With respect to the preferred multi-stage reaction technique, a solid prepolymer comprising a bis ester of a glycol and terephthalic acid made in a conventional way, e.g., by alcoholysis of the glycol and dimethyl terephthalate at elevated temperatures, optionally in the presence of a catalyst, such as a titanate ester and/or an antimony compound, is melted and heated, e.g., at 200° to 275°C., in a vacuum, e.g., such as a water aspirator vacuum, e.g., 5-25 mm. Hg. Under these condensation conditions, the glycol will be evolved and the polymer chain length will increase. Heating is continued and samples are taken for intrinsic viscosity determinations, which are related to the molecular weight. As soon as the intermediate polyester reaches a predetermined degree of polymerization, e.g., an intrinsic viscosity within the range of from about 0.3 to about 1.0 dl./g., the vacuum is interrupted and the fatty acid is added and well mixed in. Then a high vacuum is applied and polymerization is taken to the desired end point again using intrinsic viscosity as a control point. This high vacuum is achieved, for example, with a vacuum pump. Alternatively, the fatty acid can be mixed into the bis ester before condensation under a high vacuum is begun.

The products of the reaction are linear polyesters of very high molecular weight and they can be removed from the processing equipment by conventional methods, e.g., by discharging the molten resin from the vessel, e.g., through an extruder or the like. After cooling, and chopping or otherwise comminuting, the polyester can be readily processed to form molded products having excellent properties.

DESCRIPTION OF THE PREFERRED EMBODIMENTS

The following examples illustrate the preparation of polyester resins according to the process of the present invention. For comparison purposes, several procedures are set forth to demonstrate the improvement obtained by proceeding in the specified manner. The examples are not to be construed to limit the invention in any way whatsoever. Unless otherwise indicated, all parts are by weight.

EXAMPLE 1

A mixture containing a bis ester of 1,4-butanediol and terephthalic acid is prepared by heating 50 parts of dimethyl terephthalate, 46.4 parts of 1,4-butanediol (2:1 molar ratio of diol to diester), and 0.035 parts of tetra-2-ethylhexyl ortho-titanate in a reactor to above 150°C., until methanol ceases to distill off. Heating is continued until the viscosity calculated from the measured value of a sample in a 60:40 mixture of phenol and tetrachloroethane at 30°C. reaches 0.20 dl./g. Then the mixture is allowed to cool and solidify.

A 1 liter stainless steel reactor is charged with 600 g. of the 2/1 diol/dimethyl terephthalate prepolymer product and a 260°C. oil bath is used to heat the product and maintain the temperature of the reactor during the entire process. After 2 hours the prepolymer product has completely melted and a vacuum of 9–10 mm. Hg is applied with a water aspirator. Fifteen minutes later a high vacuum pump is used to apply a vacuum of 0.5 mm. Hg. Samples are periodically taken and when the intrinsic viscosity reaches about 1.0 dl./g., after 3 hours under high vacuum, the vacuum is released and 30 g. of stearic acid is added. The mixture is allowed to stir for a few minutes at atmospheric pressure, then a high vacuum of about 0.1 mm. Hg is again applied. After an additional one-half hour the intrinsic viscosity reaches about 1.2 dl./g., and the reactor is allowed to cool to terminate the condensation.

The polyester product is obtained in good yield, it is white, and has a melt viscosity of 8,000 poises. It can be molded in an injection molding machine with no sticking and the workpieces have a high gloss rating of 5 (in comparison with 2 for the control).

EXAMPLE 2

The procedure of Example 1 is repeated, but using 0.33 wt.% of stearic acid instead of 0.50 wt.%. Again the polyester product is obtained in good yield, it is white, and has a melt viscosity of 8,000 poises. It can be molded in an injection molding machine without sticking and the workpieces also have a gloss rating of 5.

For comparative purposes the procedure of Example 1 is repeated, omitting the fatty acid in one instance (control), and substituting, respectively, stearyl alcohol, methyl stearate, monoglycerol stearate and Acrawax-C.

Acrawax-C is a hard, brown modified fatty acid diamide having a melting point of 140°–142°C.; flash point of 283°C.; sp. gr., 0.975, and is a commercial mold release agent and lubricant sold by Glyco Chemicals, New York, New York.

The formulations used, the results obtained and observations made during injection molding are summarized in the Table:

Table:

| Effect of Additives on Poly(1,4-butylene terephthalate) Molding Pproperties | | | | |
| --- | --- | --- | --- | --- |
| Example | 1 | 2 | 2A* | 2B |
| Formulation (parts by weight) | | | | |
| diester of 1,4-butylene glycol and terephthalic acid | 99.5 | 99.67 | 100 | 99.5 |
| stearic acid | 0.5 | 0.33 | — | — |
| stearic alcohol | — | — | — | 0.5 |
| methyl stearate | — | — | — | — |
| monoglycerol stearate | — | — | — | — |

Table: continued

Effect of Additives on Poly(1,4-butylene terephthalate) Molding Pproperties

| | | | | |
|---|---|---|---|---|
| Acrawax-C ** | — | — | — | — |
| Properties and observations | | | | |
| Melt viscosity (poises) | 8000 | 8000 | 8000 | 2000 |
| No. of Workpieces molded | 287 | 140 | 150 | 30 |
| % of workpieces sticking in mold | 0 | 0 | 50 | 25 |
| gloss value (relative) *** | 5 | 5 | 2 | 2 |
| color | white | white | white | off-white |

| | | | |
|---|---|---|---|
| Example | 2C | 2D | 2E |
| Formulation (parts by weight) | | | |
| diester of 1,4-butylene glycol and terephthalic acid | 99.5 | 99.5 | 99.5 |
| stearic acid | — | — | — |
| stearic alcohol | — | — | — |
| methyl stearate | 0.5 | — | — |
| monoglycerol stearate | — | 0.5 | — |
| Acrawax-C** | — | — | 0.5 |
| Properties and observations | | | |
| Melt viscosity (poises) | 8000 | — | 4500 |
| No. of Workpieces molded | 30 | 30 | 30 |
| % of workpieces sticking on mold | 25 | 50 | 25 |
| gloss value (relative) *** | 1 | 1 | — |
| color | pale yellow | pale yellow | tan |

\* Control — no additive
\** Commercial modified fatty acid amide mold release additive (see test for description)
\*** 0 rating is poor – 5 rating is very high.

It is thus seen that the fatty acid of Examples 1 and 2 provides workpieces which do not stick in the mold, which have no discoloration and extremely good gloss rating. In contrast, the commonly used additives of comparative trials 2B–2E affect the color and gloss adversely, and significant percentages of the workpieces do not release from the mold.

EXAMPLE 3

To a 20-gallon stainless steel vessel (preheated to 250°C.) is added 35.3 lbs. (83.6 moles) of dimethyl terephthalate, 28.5 pounds (143.7 moles) of 1,4-butanediol and 8.0 g. of tetraoctyl titanate. After a short induction time, the methanol distills over under atmospheric pressure. After removal of the methanol, an aspirator vacuum is applied to remove the excess 1,4-butanediol. After a clear melt is obtained in the reactor, the batch is transferred to a 10 gallon polymerizer (preheated to 250°C.). The system is placed under high vacuum and mild agitation. After 2½ hours, the reactor is vented with nitrogen and 60.0 grams of stearic acid (0.33% based on polymer) is melted and added. After several more minutes under high vacuum, the batch is removed and banded. The melt viscosity at this point is 8500 poises and the intrinsic viscosity is 1.11 dl./g. Workpieces are molded in a three ounce Van Dorn machine, with temperatures of 480°F. to 500°F. (front to rear). The mold temperature is maintained at 150°F. Cycle time is 25–26 seconds. A total of 140 shots are molded and there is no sticking. The parts have a high gloss value of 5 (on a 0–5 scale).

Other modifications of the above provide processes within the scope of this invention.

For example, for a bis ester of 1,4-butanediol and terephthalic acid, substitute a bis ester of 1,4-butanediol and a 98/2 mixture of terephthalic acid and isophthalic acid; a bis ester of 1,4-butane diol and a 99/1 mixture of terephthalic acid and adipic acid; a bis ester of ethylene glycol and terephthalic acid; a bis ester of 1,3-propane diol and terephthalic acid; or a bis ester of a 98/2 mixture of 1,4-butanediol and glycerine with terephthalic acid.

For stearic acid, substitute caprylic acid, lauric acid and palmitic acid.

Because of their excellent physical, mechanical, chemical, electrical and thermal properties, the polyesters produced by the process of this invention have many and varied uses. They may be used alone as molding powders or mixed with other polymers and may contain fillers, both reinforcing, such as glass filaments, and non-reinforcing, such as wood flour, cloth fibers, clays and the like, as well as flame retardants, pigments, dyes, stabilizers, plasticizers, etc.

Obviously, other modifications and variations of the present invention are possible in the light of the above teachings. It is therefore to be understood that changes may be made in the particular embodiments of the invention described which are within the full intended scope of the invention as defined by the appended claims.

We claim:

1. A process for the preparation of a high molecular weight, linear poly(alkylene terephthalate) resin having no substantial tendency to stick to the surface of a mold when cooled from the melt therein and having a highly glossy surface appearance free from discoloration after molding, said process comprising subjecting a bis ester of a glycol and a terephthalic acid to self-condensation with the removal of the glycol in the presence of a small, effective amount of fatty acid of the general formula $$C_nH_{2n+1}COOH$$

wherein $n$ is a whole number of from about 8 to about 30.

2. A process as defined in claim 1 wherein the fatty acid is used in the amount of from 0.25 to 2.5% based on the bis ester used.

3. A process as defined in claim 1 wherein the fatty acid is stearic acid.

4. A process as defined in claim 1 wherein the glycol is ethylene glycol, 1,3-propanediol, 1,4-butanediol or a mixture thereof.

5. A process as defined in claim 1 wherein the glycol is 1,4-butanediol.

6. A process as defined in claim 1 including the step of preparing the bis ester by reacting said glycol and a di(lower)alkyl ester of terephthalic acid at a molar ratio of at least about 2:1 under alcoholysis conditions until the (lower)alkyl alcohol substantially ceases to be evolved by the reaction mixture.

7. A process as defined in claim 6 wherein the glycol is 1,4-butanediol, and the di(lower)alkyl ester is dimethyl terephthalate and the (lower)alkyl alcohol evolved is methanol.

8. A process as defined in claim 1 wherein self-condensation is carried out in three stages by i. heating the bis ester under reduced pressure at a temperature of from about 250° to about 300°C. until a first portion of the glycol has been evolved;

ii. adding the fatty acid to the partially condensed polyester of intermediate molecular weight produced in stage (i); and iii. continuing the heating under reduced pressure of the mixture produced in stage (ii) with the removal of glycol until a high molecular weight product is obtained.

9. A process as defined in claim 8 wherein the intrinsic viscosity of the partially condensed polyester produced in step (i) is within the range of from about 0.3 to about 1.0 dl./g. as calculated from the measured value in a 60:40 mixture of phenol and tetrachloroethane at 30°C.

10. A process as defined in claim 8 wherein the glycol is 1,4-butanediol, the fatty acid is stearic acid in an amount of from 0.2 to 1.5% based on the bis ester used, the reduced pressure is within the range of 0.01 to 25 mm. Hg and the temperature is within the range of 250° to 275°C.

* * * * *